March 27, 1962   R. E. BEACH ET AL   3,026,664
MOUNTING FOR CROP GATHERING AND HARVESTING UNITS
Filed May 4, 1959   5 Sheets-Sheet 4
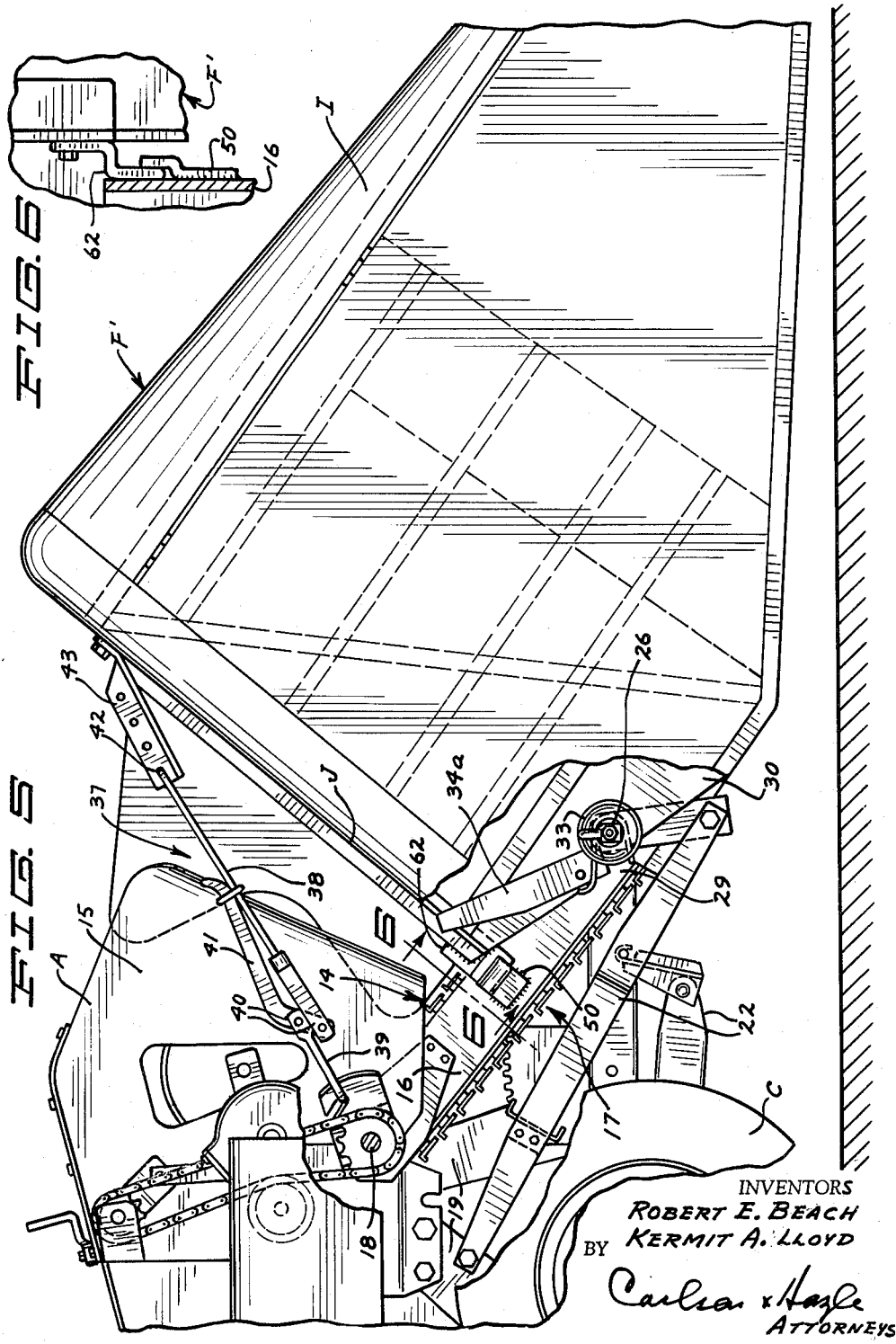
INVENTORS
ROBERT E. BEACH
BY KERMIT A. LLOYD
ATTORNEYS

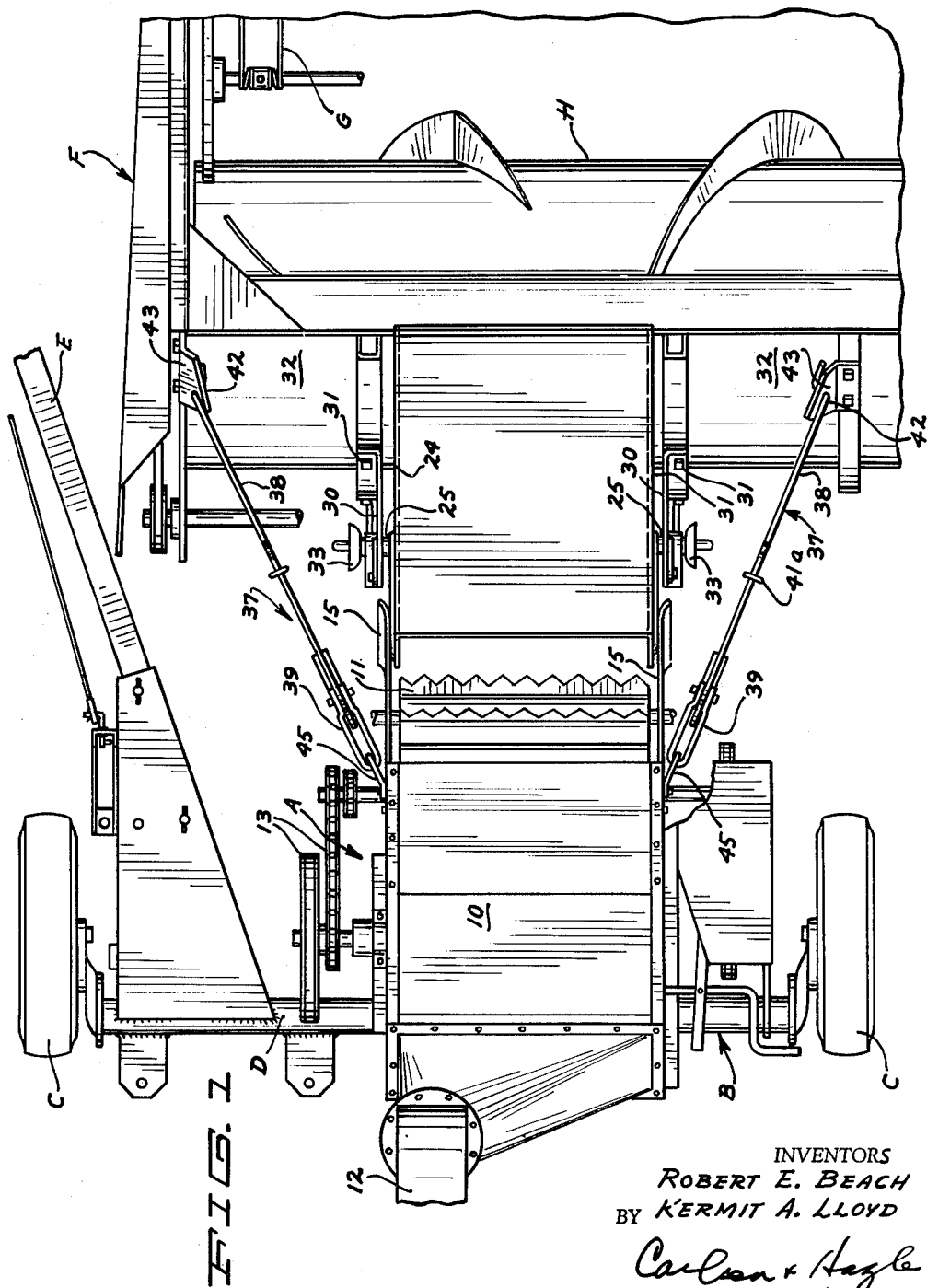

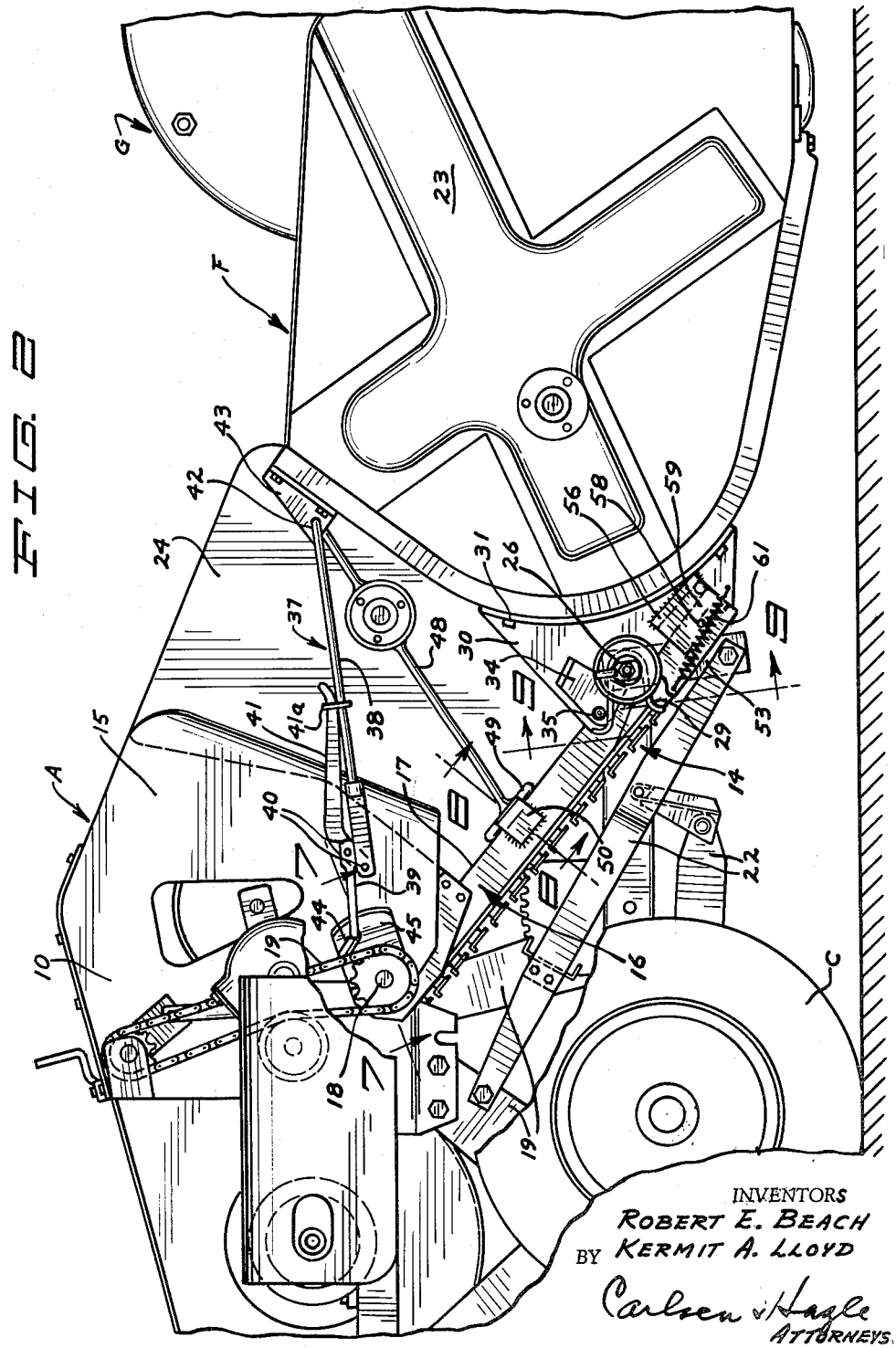

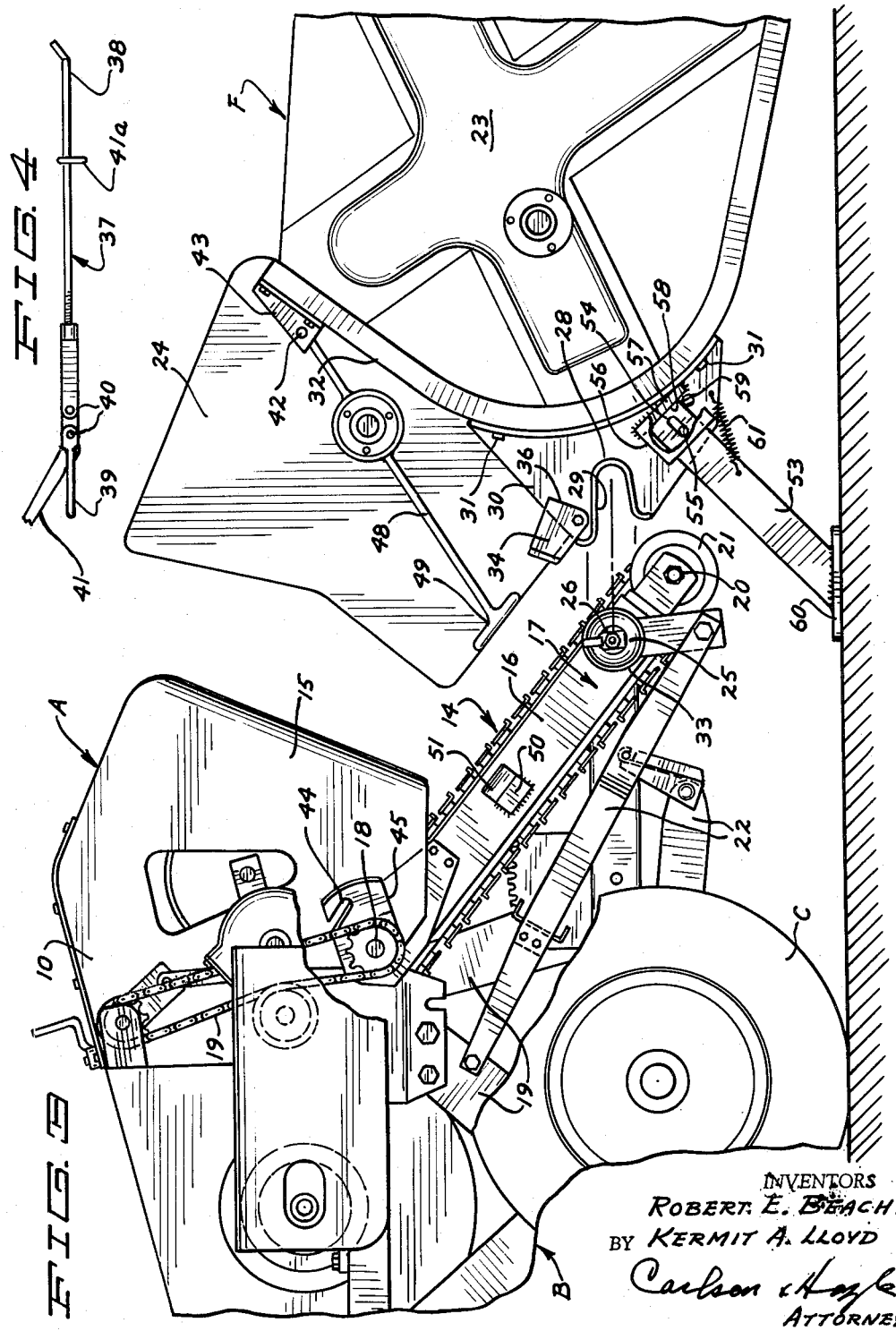

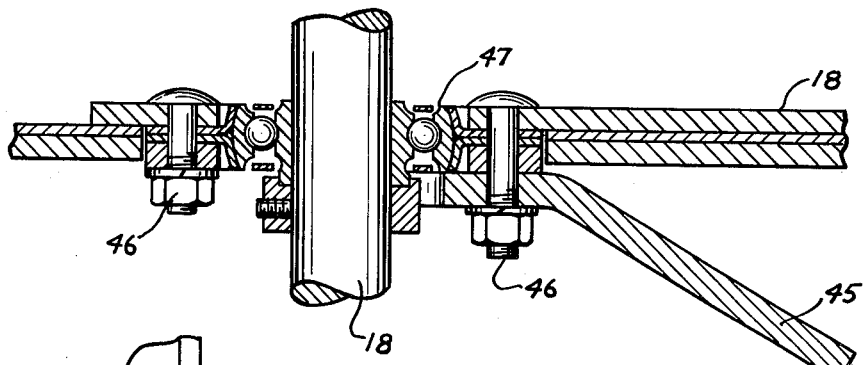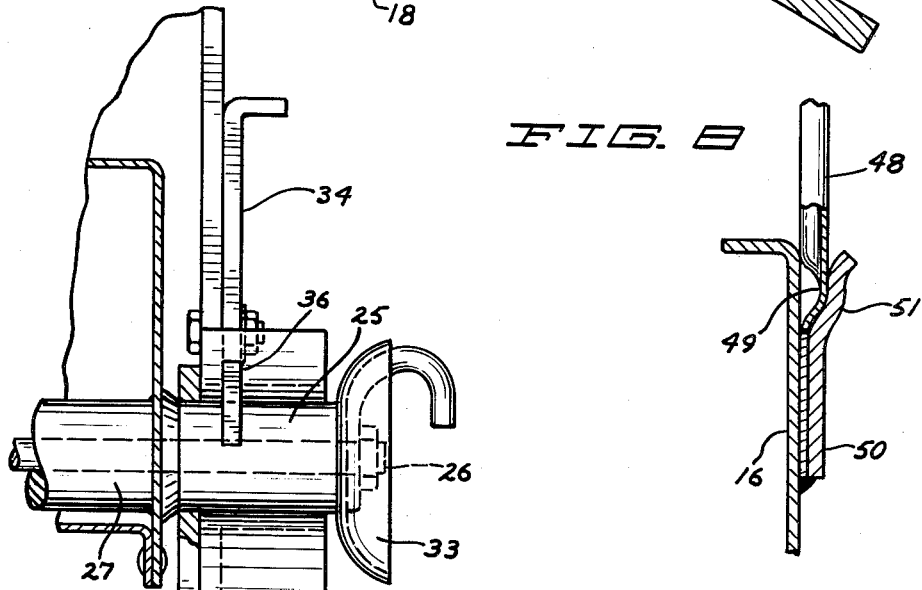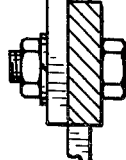

United States Patent Office 3,026,664
Patented Mar. 27, 1962

3,026,664
MOUNTING FOR CROP GATHERING AND HARVESTING UNITS
Robert E. Beach, Minneapolis, and Kermit A. Lloyd, Coon Rapids, Minn., assignors to Minneapolis-Moline Company, Hopkins, Minn., a corporation of Minnesota
Filed May 4, 1959, Ser. No. 810,759
15 Claims. (Cl. 56—10)

Our invention relates generally to improvements in agricultural implements used for harvesting and processing various farm crops, such as forage harvesters, combines, balers and the like. Such implements are used for gathering or picking up previously cut and usually windrowed crops, or for cutting, gathering and delivering standing crops to the processing units of the implements. In a forage harvester, which is chosen as an example herein to illustrate our invention, there is thus a basic processing unit including a cutter for comminuting the crop material and a blower by which this processed material is blown out through a delivery spout for accumulation in an accompanying wagon box or truck. To adapt such a machine for gathering previously mowed crops laid upon the ground in windrows the basic unit must then be equipped with a pickup gathering unit and conveyor, whereas if the crop is standing a different unit including a sickle and a conveyor must be fitted to the basic unit. This susbtitution of one gathering unit for another requires a great deal of time and heavy labor and this problem is presented as well in combines, balers and other implements as aforesaid. Representative feeders of these general kinds with pickup and sickle units respectively are shown in Patents Nos. 2,781,719 and 2,470,704. Herein we show our invention as a forage harvester associated with a pull-behind wheeled frame, but in some cases the implement may be carried by a self-propelled frame or tractor such as to be found in Patent No 2,524,083.

It is the primary object of our invention to provide an improved mounting and connecting means for operatively mounting any desired type of gathering unit, chosen according to the work at hand, upon the basic unit of the implement, without disturbance of the working parts of the basic unit such as its feed conveyors, etc., all without the use of tools, and with the very minimum of time and labor involved. A further object is to provide means whereby the gathering unit or units not in use may be supported in such position that the connection to the basic unit is made simply by driving the tractor or wheel supported basic unit toward and away from the gathering units thus supported; thus the connection is made without heavy lifting, or without use of an overhead chain hoist or the like which in itself would add to the work. Still a further object is to provide mounting and connection means for this purpose which will so rigidly connect the parts that they will operate as well together as though they are permanently connected.

These and other more detailed and specific objects will be disclosed in the course of the following specification, reference being had to the accompanying drawings, in which—

FIG. 1 is a top plan view of a forage harvester of the pull-behind type and associated with a crop gathering unit which includes a pickup for picking up previously cut crop from the field and conveying the same rearwardly toward the basic unit constituting the forage harvester, per se.

FIG. 2 is an enlarged fragmentary side elevation of the same type of assembly and showing the crop gathering unit secured to the basic unit in position for operation on the crop to be harvested.

FIG. 3 is a view similar to FIG. 2 but illustrating the crop gathering unit in its detached and parked position, with the basic or processing unit moved rearwardly with respect thereto and the parking legs on the gathering unit shown in their downwardly directed position for ground engagement.

FIG. 4 is a side elevation of one of the tie links but showing the handle portion thereof swung to the position at which the link elements are spread apart as necessary in freeing them from the machine.

FIG. 5 is a side elevation similar to FIG. 2 but showing the basic crop processing unit as operatively secured to and associated with a gathering unit designed to cut and gather a standing crop material, such as corn, and feed the same rearwardly into the basic unit.

FIG. 6 is an enlarged fragmentary sectional view along the line 6—6 in FIG. 5, showing the bracing support between the gathering unit of FIG. 5 and a portion of the frame going to make up the basic unit.

FIG. 7 is an enlarged sectional detail view on the line 7—7 in FIG. 2 showing the pivot connection by which the forepart of the basic unit and the gathering unit as associated therewith are raised and lowered in the operation of the machine, this view also showing one of the clips or brackets by which the gathering unit link at that side is fastened or hooked to the basic unit.

FIG. 8 is a detail sectional view along the line 8—8 in FIG. 2 showing the brace connection between the pickup type of gathering unit and the basic crop processing unit.

FIG. 9 is an enlarged fragmentary sectional and detail view along the line 9—9 in FIG. 2 showing the support connection made at each side between the gathering unit and the lower forepart of the basic unit going to make up the complete machine.

Referring now more particularly and by reference characters to the drawings, A designates generally a basic crop processing unit and for purposes of illustration the same is here shown as being a forage cutter and blower mechanism which includes a housing 10 carried upon a wheeled frame, designated generally at B. The wheels C by which said frame B is travel mounted for forward movement over the field are shown as mounted at the extremities of a cross axle D making up a pull-behind type of unit and in FIG. 1 there is shown a forwardly directed tongue E by which draft may be applied from a towing tractor (not shown). In some cases these wheels C may also be the forwardly located traction wheels of a tractor such as shown in Patent No. 2,524,083, in which case, of course, no such tongue E will be necessary. However mounted the unit A has its housing 10 suitably supported upon the wheeled frame B and within said housing 10 crop processing means, a portion of which appears at 11 in FIG. 1, are located for comminuting crop material fed into the housing and blowing this material outwardly and upwardly from a discharge spout, a fragment of which appears at 12 also in FIG. 1. In addition to the foregoing the basic unit A comprises suitable drive mechanism, designated collectively at 13, powered in one way or another by the tractor engine or a separate power plant (neither shown) and which mechanism, in addition to driving the crop processing means within the housing 10, also operates an apron-type conveyor 14 extending downwardly and forwardly from between laterally disposed side plates 15, the upper flight of which conveyor moves upwardly and rearwardly for delivering crop material into the open forward end of the housing 10. The conveyor 14 is disposed between side bars 16 extending downwardly and forwardly from between said side plates 15 and forming a part of a frame structure, designated generally at 17, which pivots about a transversely extending shaft 18 power rotated by a part of the aforesaid drive mechanism 13 and operating the said conveyor 14. The lower forward ends of the side bars 16 carry an idler shaft 20 on which are idlers 21 carrying the forepart of the conveyor 14 and these side bars 16 are swung upwardly and downwardly about the axis of the shaft 18 by suitable lift mechanism, designated collectively at 22, the construction and operation of one version of which is also made clear in Patent No. 2,524,-083 so that further description herein should not be required.

Suitable bracing 19 joins the housing 10 to the axle D as is best seen in the side elevations of FIGS. 2, 3 and 5.

In FIGS. 1, 2 and 4 the basic unit A is shown as fitted with a pickup type of crop gathering unit, designated generally at F, including widely spaced apart side panels 23, suitably braced and ribbed for stiffening purposes and provided with rearwardly extending but relatively inset sides 24 which fit nicely, slidably between the outwardly flaring forward ends of the aforesaid sides 15 of unit A. While not particularly material to an understanding of the present invention it may be noted that that unit F will ordinarily be provided with a suitable crop pickup device, a portion of which appears at G in FIG. 1, as well as with an auger H which directs the material picked up from the field surface rearwardly into engagement with the upwardly and rearwardly moving flight of the conveyor 14 by which this material is then moved into the unit A for processing therein. Ordinarily the units A and F are secured together by a plurality of bolts (not, of course, here shown) so that their separation not only requires the use of tools for loosening these bolts but also considerable time, labor and heavy lifting, as has been stated hereinbefore. It is the purpose of our present invention to overcome these undesirable conditions previously existing in this type of equipment as will now be described.

In accordance with our invention supports or mounting projections 25 are located in laterally extending positions adjacent the lower fore corners of the side bars 16 and while these supports may be constructed in various ways, they are here shown as being in the form of tubular extensions of a transversely extending pipe 27 through which is extended a cross rod 26 as is best shown in FIG. 9. In any event, the supports 25 thus formed are circular, as viewed from the side, to cooperate with the circular closed forward ends 28 of notches 29 which are formed in brackets 30 secured at 31 to the rounded rear corners of the back plates 32 which unite the widespread side panels 23 with the side plates 24. The notches 29 open in a rearward direction and are flanged for stiffening purposes as is clearly shown in the side elevation of FIG. 3. When the units A and F are assembled the notches 29 fit rearwardly over the supports 25 and the spacing between the brackets 30 is such that they will closely fit the outer surface of the side bars 16 in order to prevent relative lateral displacement of the parts. Dish-shaped guides 33 are held in place by the aforesaid tie rod 26 at outer ends of the supports 25 and flare apart, or outwardly in the forward direction, in order to guide the flanged notches 29 into proper engagement with the supports as is also apparent in FIG. 9. Once this connection is established between the notches 29 and the supports 25 it is retained by means of latch plates 34, pivoted at 35 to the rear corner portions of the brackets 30 above the notches, so that corners 36 of the latches will extend downwardly through suitable slots in the flanges about the notches and will rearwardly engage over the rear surfaces of the supports 25, the parts being held in such position by the forwardly overbalanced weight of the latch plates 34. Thus a normally locked but pivotal connection is established between the unit F and the lower fore portions of the side bars 16, but this connection may be released merely by swinging the latch plates 34 to the position seen in FIG. 3 where their rearwardly overbalanced weight will hold them entirely clear of the adjacent support.

In order then to pull back on and hold the upper portion of the unit F rearwardly in proper relationship with the basic unit A we provide at each side a link or link mechanism, designated generally at 37, having normally overlapping front and rear link elements 38 and 39, the adjacent ends of which are pivoted at spaced locations 40 to the bent end of a handle element 41 so that when the latter is swung into substantial parallelism with this link mechanism (as it appears in FIGS. 2 and 5) and held by a slidable ring 41ª the effective length of the link mechanism is reduced. The forward end of the front link element 38 is either pivoted or hooked at 42, as may be desired, to a bracket 43 secured to the upper corner portion of the unit F, while the rear link element 39 as here shown takes the form of an elongated eye which may be releasably hooked into an upwardly and rearwardly extending notch 44 in a clip 45 held in place by one of the bolts 46 by which a self-aligning bearing assembly 47 for the aforesaid shaft 18 is held in place in the sides 15, as is clearly seen in FIG. 7. The clips 45 angle outwardly and forwardly, as is also shown in FIG. 7, in order to facilitate engagement of these rear link elements 39 with the notches 44. It will be readily appreciated that with the link mechanisms 37 in the closed or overlapped position of either FIG. 2 or FIG. 5, there will be imparted a rearward pull upon the gathering unit, moving the same rearwardly about the axis of the transversely aligned pivot connections established by the engagement of the notches 29 with the supports 24 in order to hold the units in proper angularly and operative relationship with each other. It is, however, desirable to provide downwardly and rearwardly extending beads 48 which are stamped in the side plates 24 which beads 48 are enlarged at lower ends 49 and engaged in bracing or bearing engagement with the upper edge portions of the side bars 16 when the link mechanisms 37 are closed and fit into laterally restrained engagement with clips 50 secured in proper positions to the side bars 16, the upper extremities 51 of which are bent outwardly in order to receive said ends 49, as is clearly shown in FIG. 8.

When the gathering unit F is not in place upon the basic unit A it is supported at the proper relative angle thereto, and at a substantial elevation at its rear end above the ground, by means of a parking leg 53 on at least one side and operatively associated with the bracket 30 at that side as will now be described. At what may be referred to as its upper end the leg 53 is slotted at 54 for slidable and pivotal engagement with a pin 55 secured to said bracket 30 and extending outwardly therefrom into a clip 56 spaced from the bracket but secured thereto by an inwardly turned flange 57 at its upper end. This flange is so dimensioned that there is just sufficient spacing between the clip 56 and bracket 30 for the accommodation of the parking leg 53 and when the latter is swung to its downwardly and rearwardly extending operative position, seen in FIG. 3, its upper end 58 will bear firmly against the underside of the flange 57. Collapse of leg 53 is prevented, however, by the engagement of its upper end in a forward direction with a stop pin 59, also joining the bracket 50 and the clip 56. In order to provide adequate area for proper support of the weight of the gathering unit F the parking leg 53 is provided at its lower end with a shoe 60 disposed at the proper angle for ground engagement. When not in use the leg 53 is pulled downwardly the distance permitted by the slot 54 until the upper end of the leg clears the stop pin 59, at which point the leg may be pivoted about the pin 55 upwardly and rearwardly to the position at which it is shown in FIG. 2. The leg 53 is held in either of its positions by means of a retractile coil spring 61 stretched between the lower forward portion of the leg and a relatively forward point on the lower edge of the bracket 30 so that the spring will pull upwardly in the parked position and will slide the leg forward on pin 55 in the raised position of the leg, as is seen in FIG. 2, so that the leg will stay in its proper raised position.

In FIG. 5 we illustrate the manner in which a gathering unit F' of the type which is for cutting and gathering a standing row crop, such as corn as an example, is removably mounted upon the basic unit A, the structure of the connecting and fastening parts in general being identical with those just described. In this instance, however, the outer sheets of the gathering snouts I will overlie or overhang the junction between the supports 25 and notches 29 and it will be desirable to lengthen the latch plates, previously identified at 34 and identified in this view as 34ª, so that their rear ends are more readily accessible for manipulation. Also the rear inclined portion J of this unit F' is provided with downwardly extending brace plates 62 which engage the clips 50 and serve to brace the unit F' against the pull of the links or link mechanisms 37 in lieu of the stiffening beads 48 previously described. Otherwise the structure is fundamentally the same as that just described and the following description of the operation of the structures will suffice for both.

To separate either of the gathering units F or F' from the basic unit A the gathering unit is raised and the parking leg 53 moved to the position of FIG. 3. In order not to obliterate parts of the lower support connections the parking leg is only partially shown in FIG. 2 and is entirely omitted in FIG. 5. The gathering unit is then lowered onto the parking leg, the latch plates 34 (or 34ª) opened and the link mechanisms opened until they may be unhooked from the clips 45. The basic unit is then moved rearwardly on its wheeled frame B until it is clear of the parked gathering unit. To reconnect the units the basic unit is moved forward again until the supports 25 enter the notches and the beads 48 or clips 62 reengage the clips 50, the latch plates 34 or 34ª are again closed and the link mechanisms 37 hooked up again to the clips 45 and closed. As the gathering unit is raised the parking leg 53 may be swung upwardly out of the way and this may in fact be done before final hooking up of the link mechanisms. All of these operations are carried out quickly, easily and without tools as will be apparent.

The various pivot centers for the bars making up the lift mechanism 22 are so arranged that the pivoting of the gathering units about the shaft 18 as these units are raised and lowered will not materially alter the proper angular working relationship between the units A and F (or F') or interfere with the various link connections between the units.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a crop gathering and processing machine, a basic unit including a traveling frame and means in said unit for processing crop material as the frame travels forwardly over a field, a crop gathering unit mounted forwardly of said basic unit for gathering crop material from the field and conveying same to said basic unit for processing therein, means for mounting the crop gathering unit on the basic unit which includes transversely spaced supports on one unit and the other unit having cooperating notches for engaging said supports, said supports and notches being located on lower portions of the basic and crop gathering units and when engaged pivoting these units together, relatively upwardly located over-center pivoted fastening links located one at each side of the basic unit and each comprising a pair of link elements and a handle having spaced pivots connecting center portions of said link elements, means pivoting one of said link elements of each fastening link to one of said units and the other link elements having eyes, and the other of said units having notched brackets for releasably engaging the eyes on said link elements whereby as the link elements are drawn into overlapping relationship and are moved to over-center relative positions by said handles the basic and crop gathering units will be drawn together at upper portions.

2. In a crop gathering and processing machine, a basic unit including a wheel supported frame and means in said unit for processing crop material as the frame is moved forwardly over a field, a crop gathering unit mounted forwardly of said basic unit for gathering crop material from the field and conveying same to said basic unit for processing therein, means for mounting the crop gathering unit on the basic unit which includes laterally spaced supports on one unit and the other unit having cooperating notches for engaging said supports, said supports and notches being located near the lower portions of the basic and crop gathering units and when engaged pivoting these units together, relatively upwardly located normally overlapping fastening links located one at each side of the basic unit and each comprising a pair of link elements and a handle having spaced pivots connecting center portions of said link elements, means pivoting one of said link elements of each fastening link to one of said units and means releasably engaging the other link element with the other of said units, whereby as the link elements are moved to overlapping relative positions by said handles the basic and crop gathering units will be drawn together at upper portions.

3. In a crop gathering and processing machine, a basic unit including a wheel supported frame and means in said unit for processing crop material as the frame moves forwardly over a field, said unit having side plates, a crop gathering unit mounted forwardly of said basic unit for gathering crop material from the field and conveying same to said basic unit for processing therein, means for mounting the crop gathering unit on the basic unit which includes laterally spaced support brackets on the gathering unit for overlapping the side plates, supports on the side plates and the brackets having cooperating notches for engaging said supports, said supports and notches when engaged pivoting these units together, relatively upwardly located overlapping pivoted fastening links located one at each side of the basic unit and each comprising a pair of link elements and a handle having spaced pivots connecting adjacent ends of said link elements, and means pivoting one of said link elements of each fastening link to one of said units and means releasably connecting the other link element to the other of said units whereby as the link elements are moved to overlapping center relative positions by said handles the basic and crop gathering units will be drawn together at upper portions.

4. In a crop gathering and processing machine, a basic unit including a traveling frame and means in said unit for processing crop material as the frame travels forwardly over a field, said unit having side plates, a crop gathering unit mounted forwardly of said basic unit for gathering crop material from the field and conveying same to said basic unit for processing therein, means for mounting the crop gathering unit on the basic unit which includes laterally spaced and rearwardly projecting support brackets on the gathering unit for overlapping the side plates, supports on the side plates and the brackets having cooperating rearwardly opening notches for engaging said supports, said supports and notches when engaged pivoting these units together, relatively upwardly located overlapping pivoted fastening links located one at each side of the basic unit and each comprising a pair of link elements and a handle having spaced pivots connecting adjacent ends of said link elements, and means pivoting one of said link elements of each fastening link to one of said units and means releasably connecting the other link element to the other of said units whereby as the link elements are moved to said overlapping relative positions by said handles the basic and crop gathering units will be drawn together at upper portions.

5. In a crop gathering and processing machine, a basic unit including a wheel supported frame and means in said unit for processing crop material as the frame moves forwardly over a field, said unit having side plates, a crop gathering unit mounted forwardly of said basic unit for gathering crop material from the field and conveying same to said basic unit for processing therein, means for mounting the crop gathering unit on the basic unit which includes laterally spaced support brackets on the gathering unit for overlapping the side plates, supports on the side plates and the brackets having cooperating notches for engaging said supports, said supports and notches when engaged pivoting these units together, relatively upwardly located overlapping pivoted fastening links located one at each side of the basic unit and each comprising a pair of link elements and a handle having spaced pivots connecting adjacent ends of said link elements, means pivoting one of said link elements of each fastening link to one of said units and means releasably connecting the other link element to the other of said units whereby as the link elements are moved to said overlapping relative positions by said handles the basic and crop gathering units will be drawn together at upper portions, and means extending angularly between an upper point on the crop gathering unit and a relatively lower and rearwardly located point on the basic unit at each side to brace the units as the links are overlapped to hold said units together.

6. In a crop gathering and processing machine, a basic unit including a wheel supported frame and means in said unit for processing crop material as the frame moves forwardly over a field, said unit having side plates, a crop gathering unit mounted forwardly of said basic unit for gathering crop material from the field and conveying same to said basic unit for processing therein, means for mounting the crop gathering unit on the basic unit which includes laterally spaced support brackets on the gathering unit for overlapping the side plates, supports on the side plates and the brackets having cooperating notches for engaging said supports, said supports and notches when engaged pivoting these units together, relatively upwardly located overlapping pivoted fastening links located one at each side of the basic unit and each comprising a pair of link elements and a handle having spaced pivots connecting adjacent ends of said link elements, means pivoting one of said link elements of each fastening link to one of said units and means releasably connecting the other link element to the other of said units whereby as the link elements are moved to said overlapping relative positions by said handles the basic and crop gathering units will be drawn together at upper portions, and means extending angularly between an upper point on the crop gathering unit and a relatively lower and rearwardly located point on the basic unit at each side to brace the units as the links are overlapped to hold said units together, said last mentioned means being secured to one of said units and slidable into bracing engagement with the other of said units.

7. In a crop gathering and processing machine, a basic unit including a wheel supported frame and means in said unit for processing crop material as the frame moves forwardly over a field, said unit having side plates, a crop gathering unit mounted forwardly of said basic unit for gathering crop material from the field and conveying same to said basic unit for processing therein, means for mounting the crop gathering unit on the basic unit which includes laterally spaced support brackets on the gathering unit for overlapping the side plates, supports on the side plates and the brackets having cooperating notches for engaging said supports, said supports and notches when engaged pivoting these units together, relatively upwardly located overlapping pivoted fastening links located one at each side of the basic unit and each comprising a pair of link elements and a handle having spaced pivots connecting adjacent ends of said link elements, means pivoting one of said link elements of each fastening link to the gathering unit, eyes on the other link element, notched brackets on the basic unit for engagement with said eyes whereby as the link elements are moved to overlapping relative positions by said handles the basic and crop gathering units will be drawn together at upper portions.

8. In a crop gathering and processing machine, a basic unit including a wheel supported frame and means in said unit for processing crop material as the frame moves forwardly over a field, a crop gathering unit mounted forwardly of said basic unit for gathering crop material from the field and conveying same to said basic unit for processing therein, means for mounting the crop gathering unit on the basic unit which includes laterally spaced supports on one unit and the other unit having cooperating notches for engaging said supports, said supports and notches being located at lower portions of the basic and crop gathering units and when engaged pivoting these units together, relatively upwardly located overlapping fastening links located one at each side of the basic unit and each comprising a pair of link elements and a handle having spaced pivots connecting center portions of said link elements, means pivoting one of said link elements of each fastening link to one of said units and means releasably connecting the other link elements to the other of said units whereby as the link elements are moved to overlapping relative positions by swinging said handles to positions substantially parallel with the links the basic and crop gathering units will be drawn together at upper portions, and retainer rings to slip over the handles and one of said link elements to hold the handles in such positions.

9. For a crop gathering and processing machine which includes a basic unit having a wheel supported frame and means for processing crop material as the frame moves forwardly over a field and said unit having side plates, means for demountably securing a crop gathering unit forwardly of said basic unit for gathering crop material from the field and conveying same to said basic unit for processing therein, said means for mounting the crop gathering unit on the basic unit including laterally spaced support brackets on the gathering unit for overlapping the side plates, laterally projecting supports on the side plates and the brackets having cooperating rearwardly opening notches for engaging said supports, said supports and notches when engaged pivoting these units together, relatively upwardly located overlapping pivoted fastening links connected between the basic unit and gathering unit and operative to draw said units together, means whereby the links may be unhooked from one of said units, and brace means extending between the units and slidably associated with one of said units.

10. For a crop gathering and processing machine which includes a basic unit having a wheel supported frame and means for processing crop material as the frame moves forwardly over a field and said unit having side plates, means for demountably securing a crop gathering unit forwardly of said basic unit for gathering crop material from the field and conveying same to said basic unit for processing therein, said means for mounting the crop gathering unit on the basic unit including laterally spaced support brackets on the gathering unit for overlapping the side plates, laterally projecting supports on the side plates and the brackets having cooperating rearwardly opening notches for engaging said supports, said supports and notches when engaged pivoting these units together, relatively upwardly located overlapping pivoted fastening links connected between the basic unit and gathering unit and operative to draw said units together, means whereby the links may be unhooked from one of said units, brace means extending between the units and slidably associated with one of said units, and outwardly forwardly projecting guides on said supports to guide the notched brackets into engagement with the said supports.

11. For a crop gathering and processing machine which includes a basic unit having a wheel supported frame and means for processing crop material as the frame moves forwardly over a field and said unit having side plates, means for demountably securing a crop gathering unit forwardly of said basic unit for gathering crop material from the field and conveying same to said basic unit for processing therein, said means for mounting the crop gathering unit on the basic unit including laterally spaced support brackets on the gathering unit for overlapping the side plates, laterally projecting supports on the side plates and the brackets having cooperating rearwardly opening notches for engaging said supports, said supports and notches when engaged pivoting these units together, relatively upwardly located overlapping pivoted fastening links connected between the basic unit and gathering unit and operative to draw said units together, means whereby the links may be unhooked from one of said units, braces extending between the units and slidably associated with one of said units, outwardly forwardly projecting guides on said supports to guide the notched brackets into engagement with the said supports, and at least one parking leg pivoted on said gathering unit for movement from raised transport positions downwardly into ground engaging positions when the gathering unit is disconnected from the basic unit.

12. In a crop gathering and processing machine, a basic crop processing unit including a wheel supported frame, and said unit having side plates, a crop gathering unit mounted forwardly of said basic unit for gathering crop material from the field and conveying same to said basic unit for processing therein, means for mounting the crop gathering unit on the basic unit which includes laterally spaced support brackets on the gathering unit for overlapping the side plates, supports on the side plates and the brackets having cooperating rearwardly opening notches for engaging said supports, said supports and notches when engaged pivoting these units together, swingable lock plates on the brackets for holding the notches and supports in engagement, relatively upwardly located overlapping pivoted fastening links located one at each side of the basic unit and each comprising a pair of link elements and a handle having spaced pivots connecting adjacent ends of said link elements, means pivoting one of said link elements of each fastening link to one of said units, and means releasably connecting the other link element to the other of said units whereby as the link elements are moved to over-center relative positions by said handles the basic and crop gathering units will be drawn together at upper portions.

13. For a crop gathering and processing machine, a basic processing unit including a wheel supported frame, a crop gathering unit mounted forwardly of said basic unit for gathering crop material from the field and conveying same to said basic unit for processing therein, means for mounting the crop gathering unit on the basic unit which includes laterally located and projecting supports on one unit and the other unit having cooperating notches for engaging said supports, said supports and notches being located at lower portions of the basic and crop gathering units and when engaged pivoting these units together, relatively upwardly located normally overlapping fastening links located one at each side of the basic unit and each comprising a pair of link elements and a handle having spaced pivots connecting adjacent end portions of said link elements, means pivoting one of said link elements of each fastening link to one of said units and means releasably connecting the other link element to the other of said units whereby as the link elements are moved to over-center relative positions by said handles the basic and crop gathering units will be drawn together at upper portions, and support members extending between the basic and crop gathering units and braced therebetween tightly when the support links are moved to said overlapping positions for holding upper parts of the units together.

14. For a crop gathering and processing machine, a basic processing unit including a wheel supported frame, a crop gathering unit mounted forwardly of said basic unit for gathering crop material from the field and conveying same to said basic unit for processing therein, means for mounting the crop gathering unit on the basic unit which includes laterally located and projecting supports on one unit and the other unit having cooperating notches for engaging said supports, said supports and notches being located at lower portions of the basic and crop gathering units and when engaged pivoting these units together, relatively upwardly located normally overlapping fastening links located one at each side of the basic unit and each comprising a pair of link elements and a handle having spaced pivots connecting adjacent end portions of said link elements, means pivoting one of said link elements of each fastening link to one of said units and means releasably connecting the other link element to the other of said units whereby as the link elements are moved to over-center relative positions by said handles the basic and crop gathering units will be drawn together at upper portions, and support members extending between the basic and crop gathering units and braced therebetween tightly when the support links are moved to said overlapping positions for holding upper parts of the units together, the said support members being secured to upper rear portions of the crop gathering unit and at lower rear ends having portions for slidably engaging the basic unit and stop flanges for downwardly bracing engagement with said basic unit.

15. In a crop gathering and processing machine, a basic processing unit having a wheeled frame for forward travel over a field and an inclined conveyor swingable about a transverse axis at its upper end, a crop gathering unit for mounting in front of the basic unit, releasable locking means detachably connecting the lower portion of the gathering unit to the lower front end portion of the conveyor, a second releasable locking means detachably connecting the upper portion of the gathering unit to an upper point on the basic unit, and a rigid brace means extending between said units intermediate said locking means and held under compression therebetween to substantially carry the weight of the pickup unit and prohibit strain on said first locking means.

References Cited in the file of this patent
UNITED STATES PATENTS
2,763,115    Skromme    Sept. 18, 1956